J. STEVENS.
MEASURING APPARATUS.
APPLICATION FILED APR. 21, 1910.

995,812.

Patented June 20, 1911.

2 SHEETS—SHEET 1.

WITNESSES
G. M. Spring.
L. E. Barkley.

INVENTOR
Joseph Stevens,
by Frank S. Aaleman
Attorney

THE NORRIS PETERS CO., WASHINGTON, D. C.

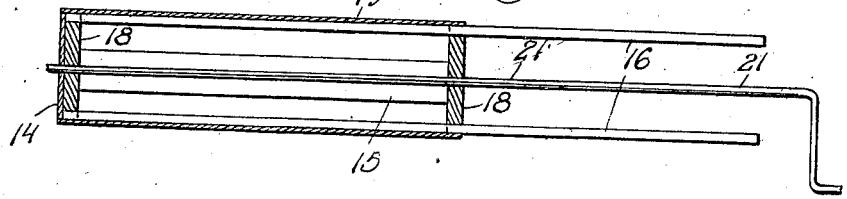
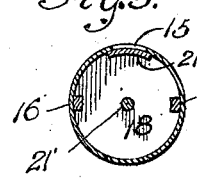
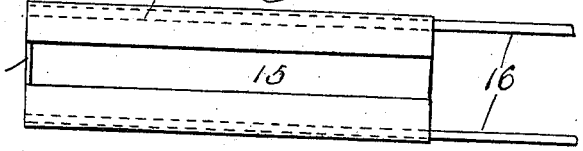
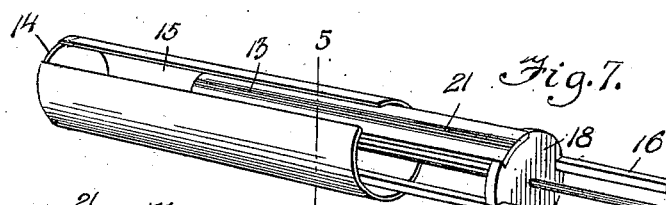
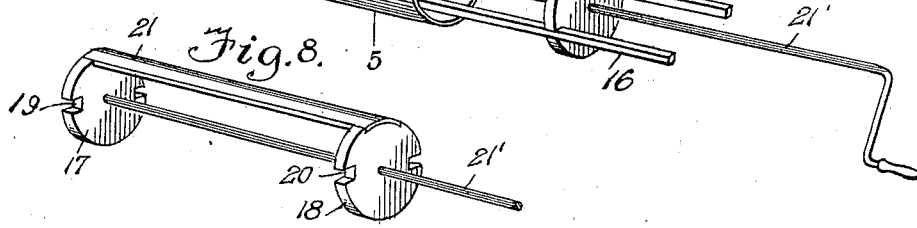
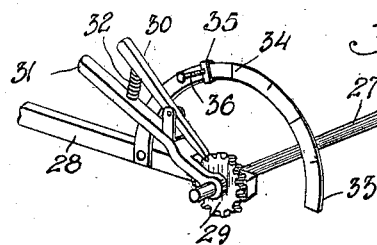

UNITED STATES PATENT OFFICE.

JOSEPH STEVENS, OF WOODLAND, MISSISSIPPI.

MEASURING APPARATUS.

995,812.  Specification of Letters Patent.  Patented June 20, 1911.

Application filed April 21, 1910. Serial No. 556,743.

*To all whom it may concern:*

Be it known that I, JOSEPH STEVENS, a citizen of the United States of America, and resident of Woodland, in the county of Chickasaw and State of Mississippi, have invented certain new and useful Improvements in Measuring Apparatus, of which the following is a specification.

This invention relates to devices for weighing or measuring material and it has reference particularly to an apparatus designed for the purpose of dispensing a predetermined amount of material at each cycle of operation, thereby enabling a dealer to remove a certain amount of material from the bin and deliver it to a receptacle provided to receive it.

An object of this invention is to produce a dispensing device of the character noted having novel means for adjusting a part thereof for increasing or diminishing the capacity of the portion thereof designed to measure the material and the invention further contemplates the provision of novel means for indicating the amount of material delivered by the apparatus.

With the foregoing and other objects in view, the invention consists in the details of construction and in the arrangement and combination of parts to be hereinafter more fully set forth and claimed.

In describing the invention in detail, reference will be had to the accompanying drawings forming part of this specification whereon in like characters denote corresponding parts in the several views, in which—

Figure 1:
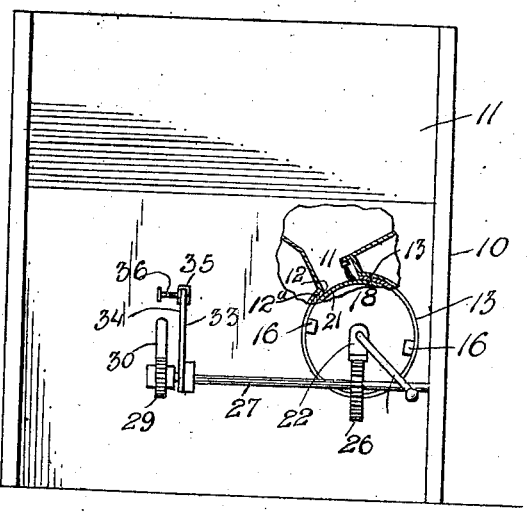
Figure 2:
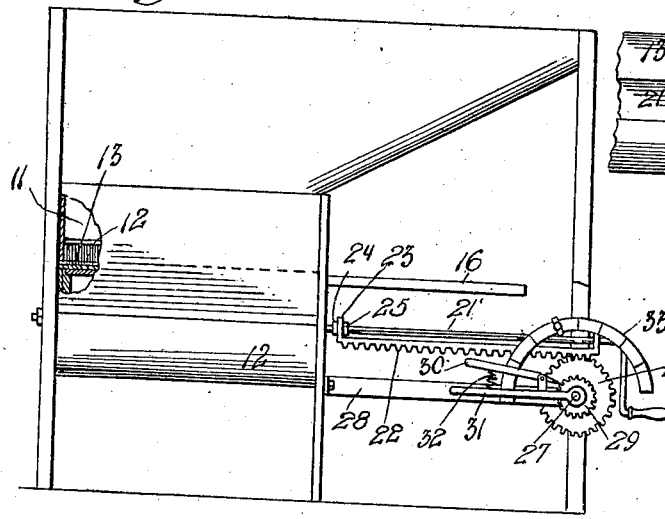
Figure 3:
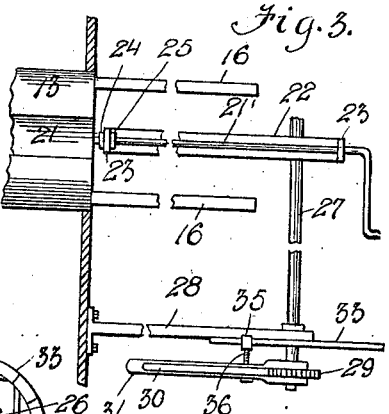

Figure 1 illustrates a view in front elevation of the apparatus embodying the invention; Fig. 2 illustrates a side view thereof; Fig. 3 illustrates a top plan view of a fragment of the apparatus; Fig. 4 illustrates a detail sectional view of the measuring device; Fig. 5 illustrates a transverse sectional view taken through the cylindrical member and the sliding member applied thereto; the section being taken on the line 5—5 of Fig. 7; Fig. 6 illustrates a top plan view of that portion of the device used for measuring the material. Fig. 7 illustrates a perspective view of the device shown in Fig. 6 with the regulating attachment applied thereto; Fig. 8 illustrates a perspective view of the regulating attachment; and Fig. 9 illustrates a perspective view of the price indicating mechanism.

In these drawings 10 denotes a suitable frame having a hopper or bin 11 thereon, the said hopper or bin having an open bottom 12 which is in communication with a pocket 12ª formed at the bottom of the hopper. The pocket 12ª has an opening in its top in communication with the hopper and another opening in its bottom which is employed for discharging the material after it has been measured. A member 13 of general cylindrical contour is mounted to partially rotate in the pocket and it has one end 14 closed. The member 13 is further provided with a longitudinally disposed opening 15 which is adapted to alternately coincide or register with the opening in the upper wall of the pocket and with the opening in the lower wall of said pocket, thus enabling an operator to bring the opening 15 into such relation to the hopper as to receive material therefrom and then to move it into such relation to the opening in the bottom of the hopper as to discharge the material therefrom, it being understood that the cylindrical member 13 will close the opening in the bottom of the hopper when the cylindrical member is turned to a position to discharge material from the cylindrical member.

As a means for increasing or diminishing the capacity of the cylindrical member, I provide the said member with two longitudinally disposed ribs 16, attached to the internal wall of the cylindrical member in any approved manner and I then mount on the said ribs the disks 17 and 18 having notches 19 and 20 respectively to receive the ribs 16. The disks are preferably equal in diameter to the internal diameter of the cylindrical member and are slidable in the cylindrical member as shown in Fig. 7. I provide a guard plate 21 which is of a width slightly greater than the width of the opening 15 in the cylindrical member in order that the said guard plate may close the opening 15, as the disks are pushed into the cylindrical member. As the disk 17 is caused to travel toward the end 14 of the cylindrical member, the space between the disk 17 and the said end 14 is diminished and therefore the capacity of the cylindrical member is regulated, the capacity being increased of course as the disk 17 is moved outwardly with relation to the end 14. The disks 17 and 18 have central apertures to receive the crank handle 21' to which the said disks are secured in order that they may take rotary motion from the crank handle as it is turned. Owing to the joints between the disks and the ribs 16, motion communicated to the disks will also be communicated to the cylindrical member, thereby causing the partial rotation of the said cylindrical member to accomplish the results heretofore indicated, viz. to cause the opening 15 to register with the hopper or to register with the discharge opening of the pocket.

As a means for regulating the positions of the disks with relation to the cylindrical member, I provide the crank handle 21' with a toothed rack 22 which toothed rack has lugs 23 apertured to receive the crank handle and I provide collars 24 and 25 on the said crank handle on each side of one of the lugs 23 in order that movement of the toothed rack may be communicated to the crank handle for the purpose of reciprocating the disks 17 and 18 on the ribs 16.

As a means for moving the toothed rack, I employ a pinion 26 which is mounted on a shaft 27. One end of the shaft 27 is journaled in a bearing in a corner post of the frame and the said shaft is also journaled in a bracket 28 extending outwardly from the face of the housing of the apparatus. The shaft 27 is provided with a toothed wheel 29 engaged by the dog 30, the said dog in turn being pivoted to an operating handle 31, one end of which is freely mounted on the said shaft. As the handle 31 is oscillated on the shaft, the dog 30 is in engagement with the toothed wheel while the shaft 27 is rotated and thus the pinion 26 is turned in the desired direction to move the toothed rack to effect an adjustment of the disk 17 with relation to the end 14 of the cylindrical member with the result heretofore stated. The dog 30 is shown as having its nose held into engagement with the toothed wheel by means of the spring 32 but I do not wish to be limited to the detail of construction for carrying this part of the invention into practice.

As a means for setting the machine in order that a known quantity of material may be delivered therefrom when it is set in a predetermined position, I provide a quadrant 33 which may be supported in any suitable manner and one surface 34 of the quadrant may be graduated to indicate pounds or fractions of pounds.

In order to limit the movement of the handle 31, a collar 35 is secured to the quadrant by means of the binding screw 36 which binding screw projects into the path of travel of the operating handle and limits the movement thereof. Thus, if the scale on the quadrant is graduated to pounds and fractions thereof and the collar is set to the mark indicating one pound, the handle 31 would be moved until it was arrested by the screw. While the handle was being moved, the shaft 27 would be partially rotated and thus the pinion 26 would engage the toothed rack and carry the disk 17 to its proper position with relation to the end 14 of the cylindrical member to create in the cylindrical member between the disk 17 and the end 14 a space capable of containing one pound of material being measured. When the space is filled and the cylindrical member partially rotated, the contents can be discharged therefrom in the manner heretofore described and this operation may be repeated very rapidly by proper manipulation.

I claim:

1. In a measuring apparatus, a hopper having an opening in its bottom and a pocket with which the opening communicates, the said pocket having an opening in its bottom, a cylindrical member partially rotatable in the pocket and having an opening designed to alternately coincide with the opening in the bottom of the hopper and the opening in the bottom of the pocket, longitudinally disposed ribs in the cylindrical member, disks having recesses to receive the ribs, a guard plate extending between the disks in alinement with the opening in the cylindrical member, a crank handle on which the disks are mounted, a rack suspended from the crank handle and adapted to communicate motion to the said crank handle, means for moving the rack, and means for indicating the quantity of material delivered by the measuring apparatus.

2. In a measuring apparatus, a hopper having an opening in its bottom and a pocket with which the opening communicates, the said pocket having an opening in its bottom, a cylindrical member partially rotatable in the pocket and having an opening designed to alternately coincide with the opening in the bottom of the hopper and the opening in the bottom of the pocket, longitudinally disposed ribs in the cylindrical member, disks having recesses to receive the ribs, a guard plate extending between the disks in alinement with the opening in the cylindrical member, a crank handle on which the disks are mounted, a wheel rotatable in the longitudinal direction of the crank handle, and means connecting the wheel with the crank handle for moving the latter longitudinally.

3. In a measuring apparatus, a hopper having an opening in its bottom and a pocket with which the opening communicates, the said pocket having an opening in its bottom, a cylindrical member partially rotatable in the pocket and having an opening designed to alternately coincide with the opening in the bottom of the hopper and the opening in the bottom of the pocket, longitudinally disposed ribs in the cylindrical member, disks having recesses to receive the ribs, a guard plate extending between the disks in alinement with the opening in the cylindrical member, a crank handle on which the disks are mounted, a toothed rack connected to the crank handle, a pinion in engagement with the rack, means for rotating the pinion, a shaft on which the pinion is mounted, a toothed wheel on the shaft, a dog for engaging the toothed wheel, and a handle for moving the dog.

In testimony whereof I hereunto affix my signature in the presence of two witnesses.

JOSEPH STEVENS.

Witnesses:
 JAMES BOWE,
 WILLIAM M. BLAND.

Copies of this patent may be obtained for five cents each, by addressing the "Commissioner of Patents, Washington, D. C."